US 9,383,272 B2

(12) United States Patent
Buck et al.

(10) Patent No.: US 9,383,272 B2
(45) Date of Patent: Jul. 5, 2016

(54) OPTICAL MEASUREMENT SYSTEM WITH POLARIZATION COMPENSATION, AND CORRESPONDING METHOD

(71) Applicant: Technische Universität München, Munich (DE)

(72) Inventors: Thorbjörn Buck, München (DE); Lars Hoffmann, München (DE); Mathias Müller, München (DE); Rolf Wojtech, München (DE)

(73) Assignee: Technische Universität München, Munich (DE)

( * ) Notice: Subject to any disclaimer, the term of this patent is extended or adjusted under 35 U.S.C. 154(b) by 0 days.

(21) Appl. No.: 14/405,667

(22) PCT Filed: Jun. 4, 2013

(86) PCT No.: PCT/EP2013/061499
§ 371 (c)(1),
(2) Date: Dec. 4, 2014

(87) PCT Pub. No.: WO2013/182567
PCT Pub. Date: Dec. 12, 2013

(65) Prior Publication Data
US 2015/0146192 A1  May 28, 2015

(30) Foreign Application Priority Data
Jun. 5, 2012  (DE) .......................... 10 2012 104 874

(51) Int. Cl.
*G01B 11/16* (2006.01)
*G01L 1/24* (2006.01)
(Continued)

(52) U.S. Cl.
CPC .............. *G01L 1/246* (2013.01); *G01B 21/042* (2013.01); *G01L 25/00* (2013.01); *G01D 5/35303* (2013.01)

(58) Field of Classification Search
CPC ....................................................... G01B 11/16
USPC ....................................................... 356/32, 33
See application file for complete search history.

(56) References Cited

U.S. PATENT DOCUMENTS 5,380,995 A * 1/1995 Udd .................. G01D 5/35303
250/227.18
5,627,927 A * 5/1997 Udd .................. G01D 5/35312
385/24
(Continued)

FOREIGN PATENT DOCUMENTS

| CN | 101253392 A | 8/2008 |
| DE | 19628200 A1 | 1/1998 |
| WO | WO-2009107839 A1 | 9/2009 |

OTHER PUBLICATIONS

International Search Report and IPRP dated Dec. 20, 2013 for PCT/EP2013/061499, 9 pages.
(Continued)

*Primary Examiner* — Roy M Punnoose
(74) *Attorney, Agent, or Firm* — Moser Taboada

(57) ABSTRACT

A method for the adjustment of an optical measurement system comprises providing an optical measurement system, which comprises, as optical elements, a beam splitter; a first photo sensor, exposed by a first partial beam from the beam splitter; an optical filter; a second photo sensor, arranged downstream of the optical filter, exposed by a second partial beam from the beam splitter. Additionally, the angularity and relative position between multiple optical elements is designed to be adjustable. The method further comprises providing a device for generating a difference signal from the two photo sensors; providing a light source with periodically varying polarization; irradiating the light in the beam splitter, so that the two respective photo sensors are exposed by a partial beam; generating a difference signal of the output signals of the photo sensors; varying the position and/or angularity of at least one optical element, and observing the difference signal, determine the combination of angularity/position of the elements where a minimum difference signal is achieved, and configuring the angularity of the optical elements to the determined values. Further, a corresponding system is proposed.

10 Claims, 5 Drawing Sheets

(51) Int. Cl.
*G01B 21/04* (2006.01)
*G01L 25/00* (2006.01)
*G01D 5/353* (2006.01)

(56) References Cited

U.S. PATENT DOCUMENTS

| | | | | |
|---|---|---|---|---|
| 5,646,401 | A * | 7/1997 | Udd | G01D 5/35383 250/227.18 |
| 5,748,312 | A * | 5/1998 | Kersey | G01L 1/246 250/227.23 |
| 5,828,059 | A * | 10/1998 | Udd | G01L 1/246 250/227.18 |
| 5,869,835 | A * | 2/1999 | Udd | G01D 5/35383 250/227.14 |
| 5,910,840 | A * | 6/1999 | Furstenau | G01J 3/45 356/364 |
| 6,204,920 | B1 * | 3/2001 | Ellerbrock | G01D 5/35383 250/227.13 |
| 6,212,310 | B1 * | 4/2001 | Waarts | G02B 6/29319 372/43.01 |
| 6,335,524 | B1 * | 1/2002 | Udd | G01D 5/35383 250/227.14 |
| 6,566,648 | B1 | 5/2003 | Froggatt | |
| 6,795,599 | B2 * | 9/2004 | Spirin | G01D 5/35303 385/12 |
| 6,876,786 | B2 * | 4/2005 | Chliaguine | G01D 5/35303 250/227.11 |
| 6,903,820 | B2 * | 6/2005 | Wang | A61B 5/0059 356/369 |
| 7,004,911 | B1 * | 2/2006 | Tu | A61B 5/015 600/549 |
| 7,038,190 | B2 * | 5/2006 | Udd | G01L 1/246 250/227.11 |
| 7,088,441 | B2 * | 8/2006 | Nahum | G01J 9/00 250/226 |
| 7,253,902 | B2 * | 8/2007 | Feldman | G01J 9/00 356/222 |
| 8,760,663 | B2 * | 6/2014 | Tearney | A61B 5/0062 356/479 |
| 8,864,655 | B2 * | 10/2014 | Ramamurthy | A61B 5/06 600/117 |
| 2002/0126944 | A1 * | 9/2002 | Kim | G01M 11/088 385/15 |
| 2002/0188417 | A1 * | 12/2002 | Levy | G01N 21/211 702/155 |
| 2003/0127587 | A1 * | 7/2003 | Udd | G01L 1/246 250/227.14 |
| 2005/0219536 | A1 * | 10/2005 | Feldman | G01J 9/00 356/419 |
| 2010/0141930 | A1 | 6/2010 | Omichi et al. | |
| 2015/0268096 | A1 * | 9/2015 | Udd | G01J 3/1895 356/32 |

OTHER PUBLICATIONS

Written Opinion mailed Jan. 14, 2014 for PCT Application No. PCT/EP2013/061499.

* cited by examiner

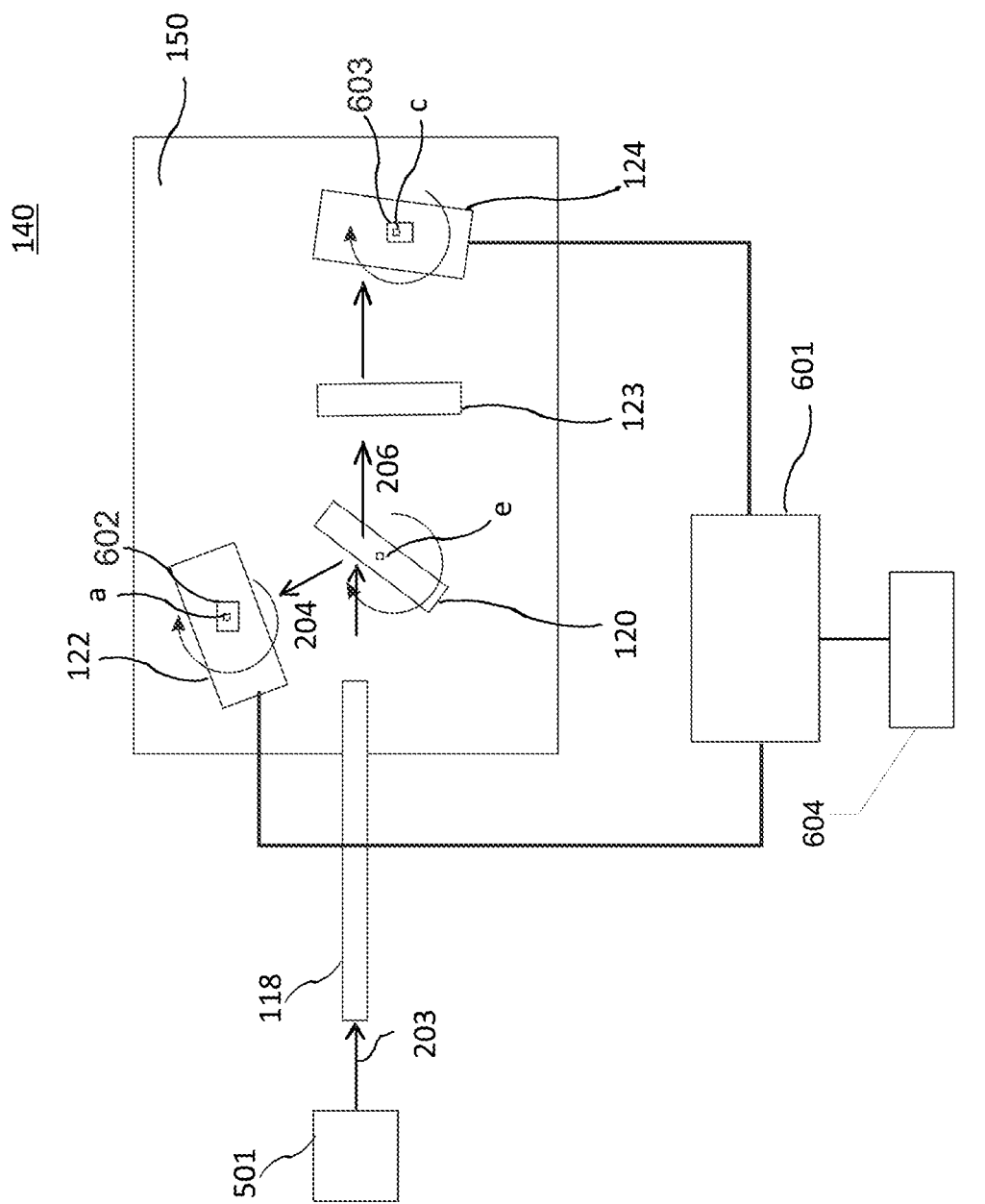

OPTICAL MEASUREMENT SYSTEM WITH POLARIZATION COMPENSATION, AND CORRESPONDING METHOD

FIELD OF THE INVENTION

The present application relates generally to a method for adjusting optical apparatus, particularly optical measurement apparatus for determining mechanical quantities, more specifically measurement apparatus with sensors integrated into light wave guides, in order to increase measurement accuracy. Further, the present application relates to a system for the adjustment of said optical apparatus.

STATE OF THE ART

In the determination of mechanical quantities, for example forces, moments, accelerations, etc. optical instrumentation is becoming increasingly important. Here, fiber optic measurement systems are deployed, having optical sensor elements embedded in fiber optic cables. Such sensor elements may, for example, be configured as fiber Bragg grating sensors. In this case, integrated sensors are exposed to optical radiation in a suitable wavelength range, wherein a portion of the incident light is reflected from the sensor depending on the configuration of the sensor element and the mechanical quantity applied to the sensor element, and an evaluation and analysis unit may be supplied.

Intensity and/or wavelength range of the optical radiation reflected by the sensor element, or of the optical radiation transmitted by the sensor element, have properties which are influenced by the applied mechanical quantity, for example, a force to be measured. Light wave guide based, or fiber optic, force sensors and corresponding measurement processes have a variety of applications, for example, monitoring mechanical structures, detecting mechanical stresses in structures, remote diagnosis of loads on structural elements, and measuring forces, moments, etc.

The sensor elements integrated into optical sensor fibers, such as fiber Bragg grating sensors (FBG sensors), are sensitive to elongation of the sensor fiber, whereby the wavelength spectrum reflected in or transmitted through the fiber is affected. Elongation of the fiber and/or alteration of the fiber Bragg grating structure is affected not only by the mechanical quantity to be measured, such as force, but may also be affected by undesirable disturbing quantities such as fluctuations in temperature. Such undesired effects may lead to a decrease in measurement accuracy during optical determination of force-related quantities.

Another disturbing effect is relevant to known fiber optic measurement apparatus based on edge filter arrangements. Such measurement systems may be implemented as all-in-fiber based arrangements, integrated optical structures or (micro) optical structures.

FIG. 1 shows a systematic block diagram of a known fiber optic measurement apparatus designed for determining at least one quantity to be measured. The fiber optic measurement apparatus has a primary light source 101 for providing optical radiation, with which at least one optical fiber Bragg sensor element 303 is exposed. The radiation is firstly transmitted through an optical transmission fiber 302 to fiber coupler 102, which serves to direct reflected light from a reflection on the optical sensor element 303 back through a sensor fiber 304 to an optical evaluation unit 109.

The light reflected from sensor element 303 and directed through the optical sensor fiber 304 and fiber coupler 102 is referred to as secondary light 202. The secondary light 202 may subsequently be analyzed in the optical evaluation unit 109. The optical evaluation unit 109 may, for example, be in the form of an optical filter, which serves to filter the secondary light 202 in order to subsequently obtain a filtered Bragg signal 203. The filtered Bragg signal has information about the wavelengths reflected through the sensor element embedded within, such that through determination of the wavelength, an elongation of the optical sensor element (fiber Bragg grating) and hence a force to be measured applied to the optical sensor element 303 can be determined. Such a determination is performed by a separate detection unit 104 connected to the optical evaluation unit 109.

FIG. 2 shows a detailed view of the optical evaluation unit 109 and the detection unit 104 in the case of a ratiometric fiber Bragg grating measurement arrangement. Here, the secondary light 202 coming from the optical sensor element 303 is directed to two optical filters 110, 111 within the evaluation unit 109. The filters have complementarily-shaped filter curves, so that with a shift in wavelength of the incoming light 202, the transmission through one of the two filters rises, while it sinks in the other. From the change in the output level of the two filters 110, 111 downstream of the light sensors (not shown here), and after amplification of the change in Bragg wavelength of the sensor element 303 shown in FIG. 1, the change in the measured mechanical quantity can be concluded, as described above. The detection unit 104 outputs corresponding electrical output signals, which are subsequently directed to determination unit 112, which is connected to the detection unit 104 under normal operating conditions. The determination unit 112 now determines a measurement result signal 301, which, for example, represents a measurement for the determinable mechanical quantity from the elongation of the optical sensor element 303, for example, a force which acts on a structural element, connected to the fiber, of a machine.

In general, such ratiometric fiber optic measurement systems have additional problems in comparison to conventional FBG measurement systems (with a spectrometer or laser). For example, the optical properties of the optical and/or optoelectric components can be influenced by temperature. This results in an unwanted temperature drift of the measurement system. Additionally, optical background light caused by, for example, contaminated plug connectors, PC plug connectors or faulty fiber connectors can lead to measurement errors.

An as-yet unrecognized influencing quantity for ratiometric fiber Bragg grating measurement systems (FBG) is the influence that the polarization state of the light used (for example, from the source 101) has on the measurement. (Fiber) optic components have in general a transmittivity, reflectivity and sensitivity depending on a polarization state of the incident light. This leads to, for example, in the case of the ratiometric filter principle described above, that different effective optical filter curves are produced, depending on polarization state. Consequently, this results in measurement errors in wavelength calculation caused by polarization.

In light of the above, it is desirable to have an optical measurement system in which the influence of polarization of the light used on the measurement accuracy is minimized or eliminated.

SUMMARY OF THE INVENTION

According to one embodiment, the present invention provides a method for adjusting an optical measurement system.

The method comprises providing an optical measurement system, which comprises, in the form of optical elements, a beam splitter; a first photo sensor exposed to a first partial beam from the beam splitter; an optical filter; a second photo sensor, positioned upstream of the optical filter, exposed to a second partial beam from the beam splitter. Additionally therein, the angularity and relative position between multiple optical elements are adjustable. The method further comprises providing a device for constructing the difference signals from the signals of the two photo sensors; providing a light source with periodic variances in polarization, illuminating the beam splitter with the light, so that both photo sensors are exposed by each respective partial beam; constructing a difference signal of the output signals of the photo sensors; varying the position and/or angularity of at least one optical element, and observation of the difference signal, determining the combination of angularity/position of the elements which results in a minimum of the difference signal, and setting the angularity of the optical elements at the determined value.

According to another embodiment, the present invention provides a system for polarization compensated adjustment of an optical measurement system. The system comprises a beam splitter, a first photo sensor, which is arranged to be exposed by a first partial beam from the beam splitter; an optical filter, which is arranged to be exposed by a second partial beam from the beam splitter; a second photo sensor arranged downstream of the filter, and a light source for light with periodic variances in polarization, wherein the polarization is periodically varied through active elements.

BRIEF DESCRIPTION OF THE DRAWINGS

Exemplary embodiments are illustrated in the drawings and explained in detail in the following description. In the drawings:

FIG. 6 shows a schematic view of a portion of the system for adjusting a fiber optic measurement apparatus, the system including a controlling device, regulator control elements, and a storage device, according to exemplary embodiments.

In the drawings, identical reference numbers describe identical or functionally identical components or steps.

DETAILED DESCRIPTION OF THE INVENTION

Figure 1:
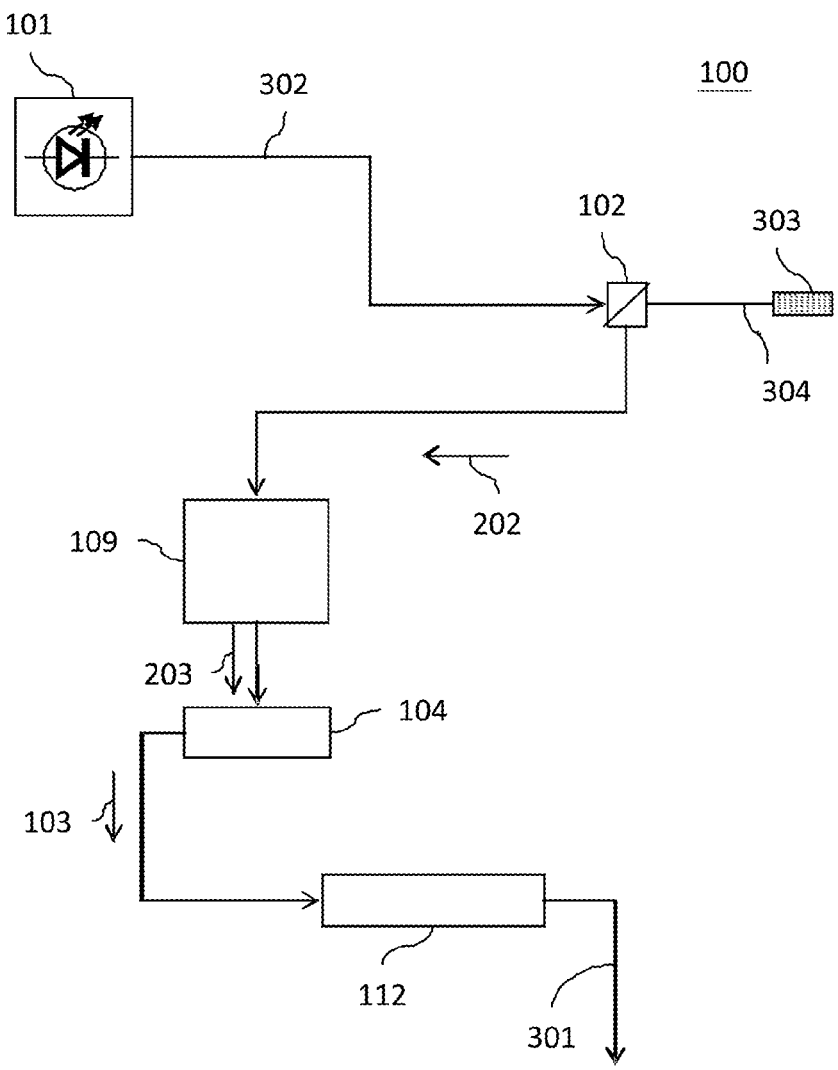
FIG. 1 shows a known measurement system based on the fiber Bragg principle.

In the following, detailed reference is made to various embodiments of the invention, wherein one or more examples are illustrated in the drawings.

Embodiments of the invention relate to a system for adjusting an optical measurement system and a corresponding method. Here, an optical measurement system is conceived, comprising a beam splitter, at least one optical filter, and two photo sensors. The system is, for example, typically, but not necessarily, mounted on a plate 150, so that the light path between the components lies on a plane parallel to the baseplate. One such construction is shown in FIG. 3.

Figure 2:
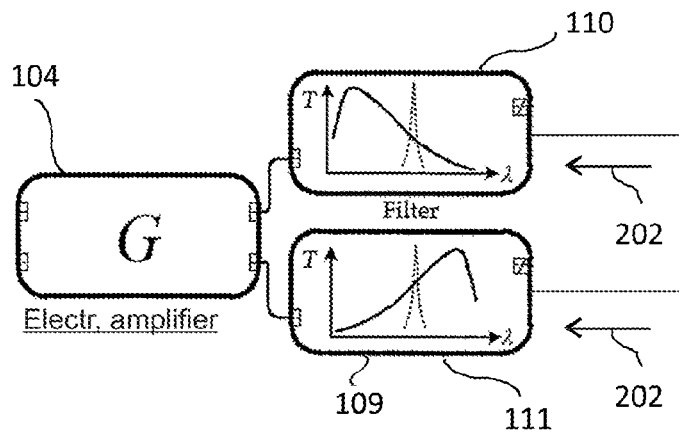
FIG. 2 shows a partial schematic view of a known ratiometric fiber Bragg measurement system.
Figure 3:
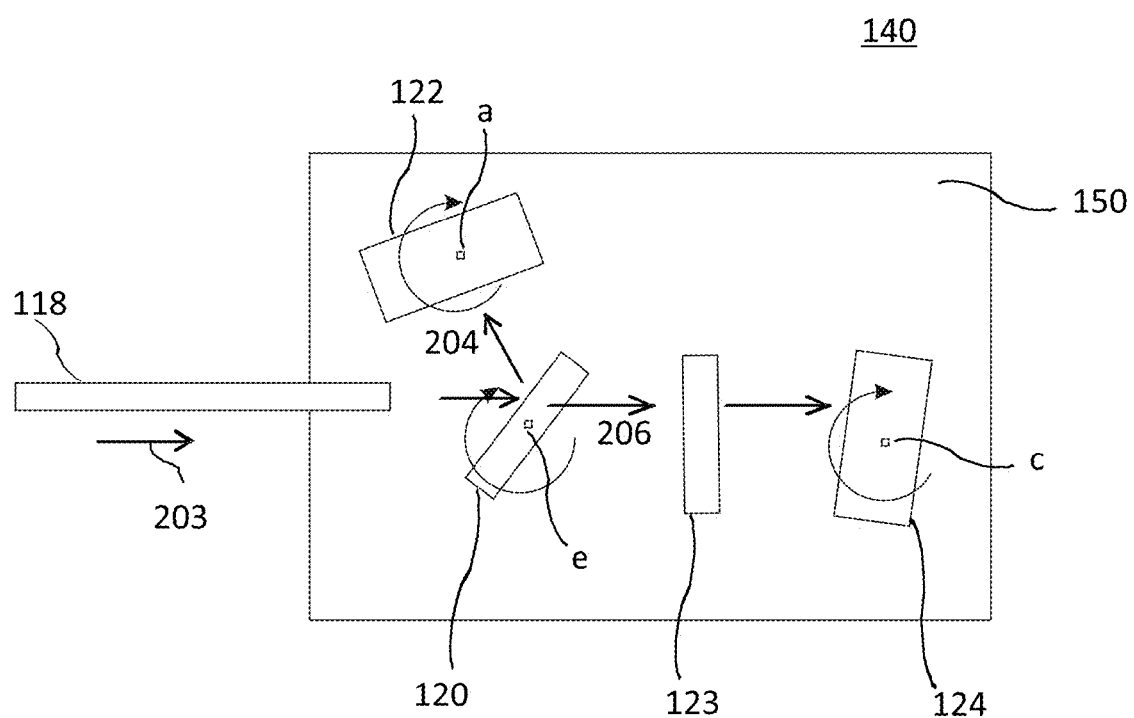
FIG. 3 shows a schematic view of a portion of the system for adjusting a fiber optic measurement apparatus according to exemplary embodiments.
Figure 4:
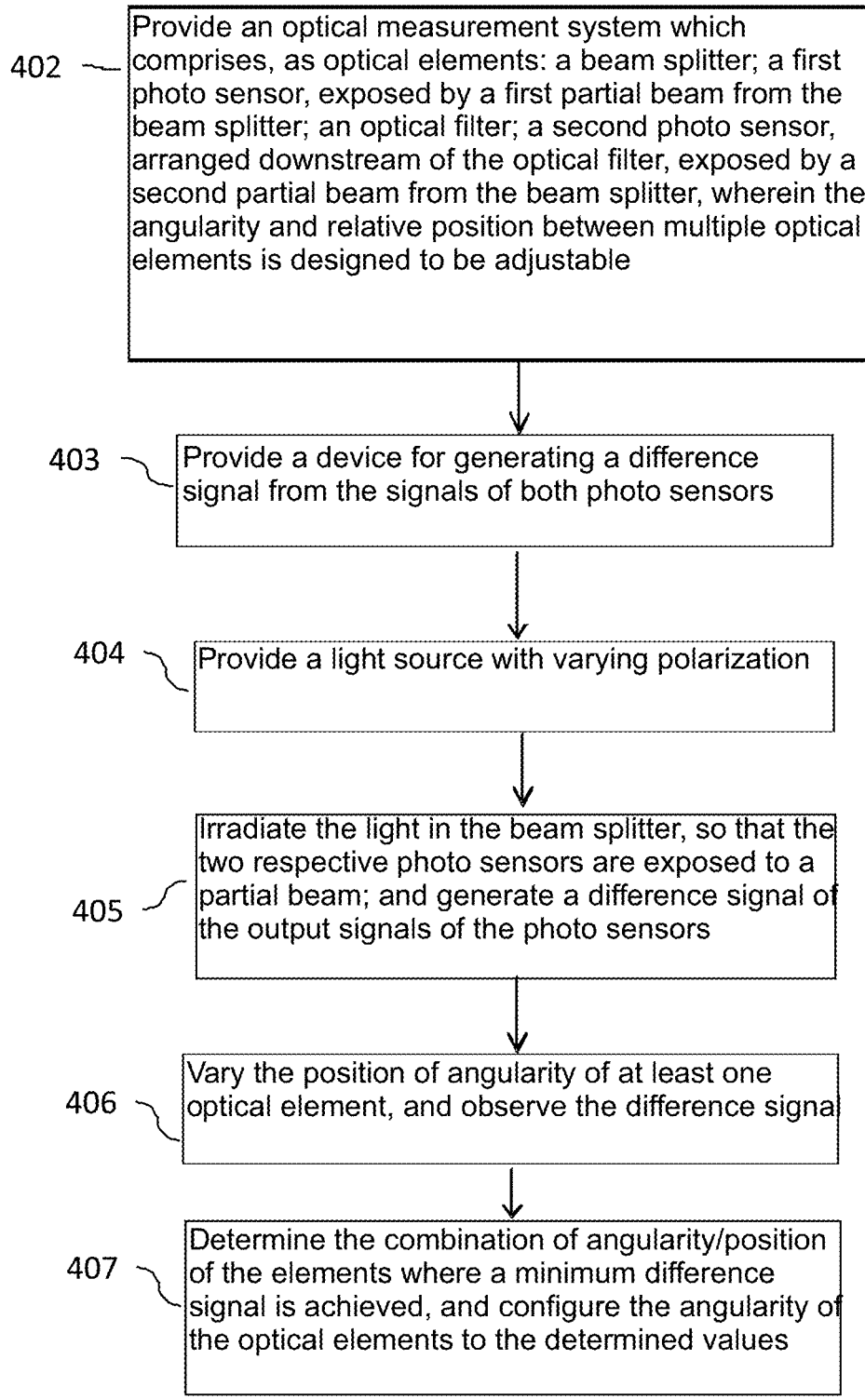
FIG. 4 shows a schematic representation of a method according to embodiments.

FIG. 3 shows a portion of a ratiometric fiber Bragg grating (FBG) measurement system according to exemplary embodiments. During a measuring operation (not presented here in the foreground), reflected light 202 from a FBG sensor 303 (not shown here, see FIG. 1, for example) is guided to a (micro) optic construction 140 through a glass fiber 118. A first portion 204 of the incident light is directed by a beam splitter device 120 to a reference detector 122. The undiverted portion 206 is directed through an optical filter element 123, through a filter 123, to a photo diode 124. From the measured intensity signals at reference diode 122 and filter photo diode 124 (analogous to the construction shown in FIG. 2), the Bragg wavelength of the sensor 303 is determined through an algorithm.

Figure 5:
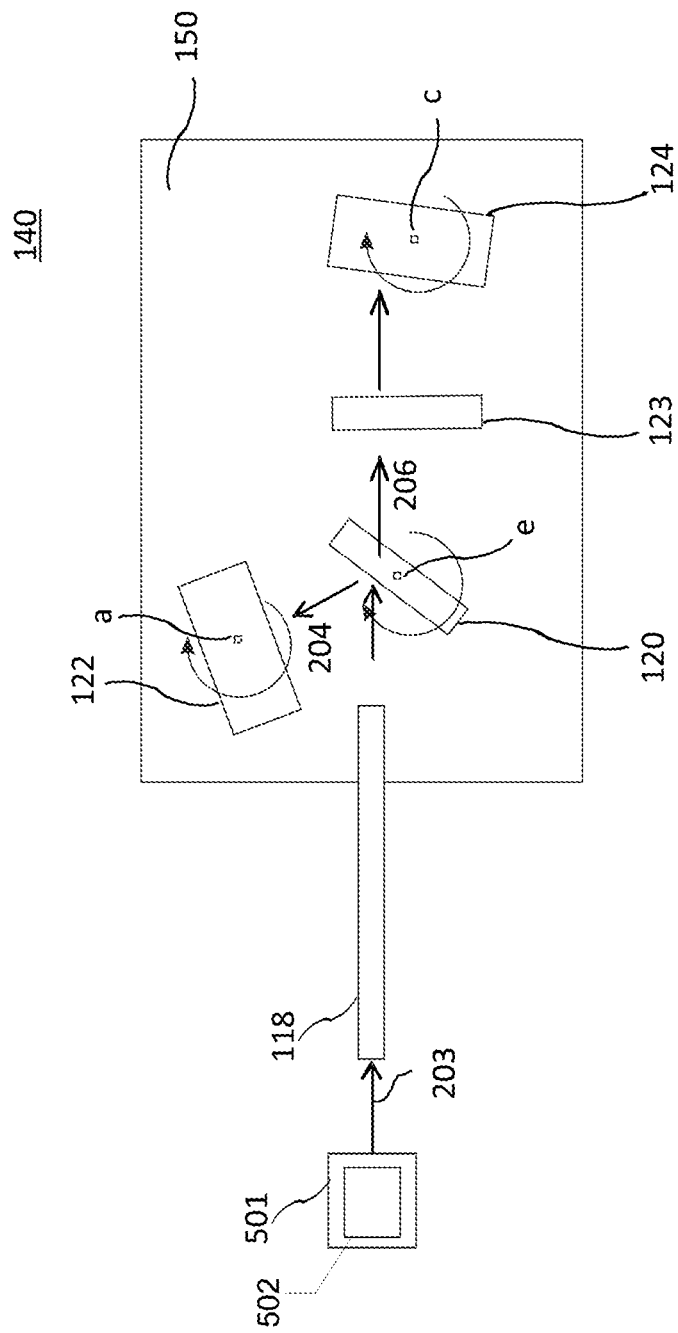
FIG. 5 shows a schematic view of a portion of the system for adjusting a fiber optic measurement apparatus, the system comprising a light source for generating light with periodically varying polarization, according to exemplary embodiments.

FIG. 5 shows a schematic view of a portion of the system for adjusting a fiber optic measurement apparatus, the system comprising a light source 501, including λ/4 plates 502 for generating light with periodically varying polarization, according to some embodiments. FIG. 6 shows a schematic view of a portion of the system for adjusting a fiber optic measurement apparatus, the system including a controlling device 601, regulator control elements 602, 603, and a storage device 604, according to exemplary embodiments.

In embodiments, light 203 specifically generated for adjustment, instead of light from a fiber Bragg grating as for a subsequent conventional measurement process, is guided through the fiber 118 in the optic construction for the adjustment of the optic construction 140. The light 203 is characterized according to embodiments by a periodically varying polarization. For example, the light from a laser may be directed through an arrangement of multiple λ/4 plates 502, wherein the plates are moved periodically or randomly through a mechanical arrangement such as piezo actuators or small electric/stepper motors. Fundamentally, a λ/4 plate may delay light which is polarized parallel to a component-specific axis, specifically one quarter wavelength—or π/2—with respect to this perpendicularly polarized light. With correct exposure, circularly or elliptically polarized light may be made from linearly polarized light, and linearly polarized light may further be made from circularly polarized light. According to exemplary embodiments, it is irrelevant which actual polarization the generated or modified light 203 has at any point in time when it is directed into the optical construction, as long as the type of polarization periodically varies. It is understood by the person skilled in the art, that light with periodically variable polarization may be generated in a variety of types which here require no further explanation.

In general, the optical components 120, 122, 123, 124 used in construction 140 have a polarization dependent loss (PDL), or a polarization dependent sensitivity. In the example given in FIG. 3, these are the beam splitter 120, the optical filter 123 and the two photo sensors 122, 124. As mentioned in the introduction, these polarization dependent components can affect a determined measurement result from a ratiometric optical measurement system.

For minimizing the effects of PDL elements, according to exemplary embodiments, the systematic arrangement of the individual PDL elements taking into consideration the system (filter) function minimizes the effects of undetermined polarization states or grades on the measurement result.

Additionally, the periodically polarization varying light 203 is irradiated through the fiber 118 into the optical construction 140.

The derivation outlined in the following relates to the compactly depicted case of entirely linearly polarized light. The method described herein for minimizing the effects of PDL elements on the measurement result is generally applicable, independent of this depiction, to optical FBG edge filter measurement arrangements, which may be implemented as all-in-fiber based arrangements, integrated optical constructions or (micro) optical constructions. The expected measurement error AA is given by two photo diode channels (in the case of linearly polarized light):

$$\Delta\lambda = \sum_i \frac{\partial \rho^{-1}}{\partial \Phi_i} \cdot \frac{\partial \Phi_i}{\partial \phi_i} \cdot \Delta\phi_i$$

wherein $\rho^{-1}$=inverse filter function,
$\Phi_i$=output signal of the ith detector,
$\phi_i$=polarization angle in ith optical path $$= \frac{\partial \rho^{-1}}{\partial \Phi_1} \cdot \frac{\partial \Phi_1}{\partial \phi_1}\bigg|_{\phi_{1,0}} \cdot \Delta\phi_1 + \frac{\partial \rho^{-1}}{\partial \Phi_2} \cdot \frac{\partial \Phi_2}{\partial \phi_2}\bigg|_{\phi_{2,0}} \cdot \Delta\phi_2$$

with $\Delta\phi_1 = \Delta\phi_2 = \Delta\phi$ (no effect linear→elliptical, etc.)

$$= \Delta\phi \cdot \left[\frac{\partial \rho^{-1}}{\partial \Phi_1}\bigg|_{\lambda B} \cdot \frac{\partial \Phi_1}{\partial \phi}\bigg|_{\lambda B} + \frac{\partial \rho^{-1}}{\partial \Phi_2}\bigg|_{\lambda B} \cdot \frac{\partial \Phi_2}{\partial \phi}\bigg|_{\lambda B}\right]$$

wherein $\lambda_B$ is the Bragg wavelength.
The terms $$\frac{\partial \Phi_1}{\partial \phi_1}$$

depend on the overall spectral PDL $\Gamma_i$, the specific optical path and the specific angle $\phi_i$.

To realize an extensive or fully polarization-independent measurement system, according to exemplary embodiments, the term in the square brackets must be minimized. This is typically done by adjusting the angularity of the optical elements 120, 122, 123, 124 in relation to the respective incident light beams 203, 204, 206. In exemplary embodiments, the beam splitter 120 is typically rotated about an axis e, while the other components are fixed; or the beam splitter 120 is fixed, and the (possibly mechanically connected) device including the photo sensors 122, 124 and the filter 123 is rotated as a complete unit about axis e of the beam splitter 120, or rotated about another axis. Similarly, the two photo sensors 122, 124 may be rotated about their respective axes a, c.

The derivation outlined above relates to the case where fully linearly polarized light, without polarization-affecting elements (for example, linear to elliptical) in the optical path. However, the method for minimizing the effects of polarization degree/state/angle is applicable for any light conditions, although in this case, not analytically representable in the form outlined above.

In the manner described above, the measurement error may be minimized through the use of optical/optoelectronic components with non-vanishing PDL. Embodiments of the invention thus relate to the implementation of a measurement system with components with non-vanishing PDL, using a method for minimizing the maximum resulting measurement error.

During the above described adjustment, a difference signal is produced from the output signals of the two photo sensors 122, 124, similarly described in reference to FIG. 2. During this process, light 203 as described above, with periodically varying polarization, is irradiated into construction 140. During the adjustment of the angularities, the difference signal is measured. The difference signal in relation to the corresponding angularities of the adjusted components may be stored in an electronic storage device. After the completion of a measurement cycle, that typically being sequentially passing through the angular range of the adjustable components, the use of an algorithm allows for determining which angularity setting (e.g. the beam splitter 120) or which combination of angularity settings of the individual components 120, 122, 123, 124 results in a minimum difference signal. At the conclusion of the adjustment method, according to exemplary embodiments, this angular setting is set and the components fixed, so that no further (e.g. accidental) adjustment is possible.

In one variant, during the adjustment of the angular positions of the components, the wavelength of the light source may be changed. Here, an OPO laser, or other tuneable light sources, may be used. In this case, during the adjustment process, with the same angularity of a component, several difference signals may be generated for different wavelengths. These may be, for example, stored as a successive average, so that after a certain time of adjustment of a specific angularity, an average difference signal from multiple different wavelengths is generated and stored.

The PDL is technically defined as a positive value. It should be noted, that by observation of the PDL with reference to a reference direction, this value may become negative—that is, in the specific example, it is a lower transmission with respect to the reference direction.

Through the above described variation of the angularities of the optical elements, and the determination of the differential signal at different polarization modes and light frequencies, a minimal polarization-induced measurement error may be determined, and accordingly, with which angularities and positions of the optical elements of construction 140 may the minimal, or optimal, measurement error be achieved.

In principle, any number of arrangements of the optical elements of construction 140 may be realized. Furthermore, the optical construction 140 is not limited to (micro) optical constructions—pure fiber-based or filter-based measurement constructions may also be optimized through suitable alignment of the fibers and the optical components in consideration of the expected measurement error, following the above method according to embodiments.

The adjustment procedure according to exemplary embodiments is automatically performed, storing the respective angular parameters and the associated differential sensor output signals. That is, the angular adjustments are performed with regulator control elements 602, 603, for example stepper motors, which are coupled to a controlling device 601.

Fiber optic measurement systems according to embodiments may accordingly have a controlling device 601 and a storage device 604, arranged for performing the method stated above. Such fiber optic measurement systems are typically deployed for the determination of mechanical quantities. Here, a mechanical quantity is applied to a fiber Bragg grating, such that the Bragg wavelength of the fiber Bragg grating is changed by the mechanical quantity.

The invention claimed is:

1. A method for adjustment of an optical measurement apparatus, comprising:
   providing an optical measurement apparatus, which comprises, as optical elements:
   a beam splitter;
   a first photo sensor, exposed by a first partial beam from the beam splitter;
   an optical filter;
   a second photo sensor, arranged downstream of the optical filter, exposed by a second partial beam from the beam splitter,
   wherein the angularity and relative position between multiple optical elements is arranged to be adjustable and wherein the first and second photo sensors are configured to generate different output signals;
   providing a device for generating a difference signal from the signals of both photo sensors;
   providing a light source for generating light with periodically varying polarization;
   irradiating the light into the beam splitter, so that both photo sensors are exposed by each respective partial beam;
   generating a difference signal of the output signals of the photo sensors;
   varying the position and/or angularity of at least one optical element, and measuring the difference signal; and
   determining the combination of angularity/position of the elements which achieves a minimum difference signal.

2. The method according to claim 1, further comprising:
   varying a frequency of the incident light in addition to the variation of the polarization.

3. The method according to claim 1, wherein the respective difference signals from the output signals of the photo sensors are stored with the corresponding angular data of the individual components in an electronic storage device.

4. The method according to claim 1, wherein after scanning over the adjustment range of the optical elements, it is determined which angularities result in a minimum difference output signal, and whereupon the respective photo sensor is attached and fixed in the corresponding position.

5. The method according to claim 1, wherein the periodically varying polarization of the incident light is generated by moving λ/4 plates.

6. A system for polarization-compensated adjustment of an optical measurement, apparatus, which comprises optical elements comprising:
   a beam splitter;
   a first photo sensor, arranged to be exposed by a first partial beam from the beam splitter;
   an optical filter, arranged to be exposed by a second partial beam from the beam splitter;
   a second photo sensor arranged downstream of the optical filter, wherein the first and second photo sensors are configured to generate different output signals;
   a light source for generating a light beam with periodically varying polarization, wherein the light beam is directed at the beam splitter,
   an electronic controlling device for determining the difference output signals of the first and second photo sensors; and
   regulator control elements for varying the angularity of the photo sensor.

7. The system according to claim 6, wherein the controlling device is configured to perform an adjustment method comprising:
   irradiating the light into the beam splitter, so that both photo sensors are exposed by each respective partial beam;
   generating a difference signal of the output signals of the photo sensors;
   varying the position and/or angularity of at least one optical element, and observation of the difference signal; and
   determining the combination of angularity/position of the elements which achieves a minimum difference signal,
   wherein the angularity and relative position between multiple optical elements is arranged to be adjustable.

8. An optical measurement method comprising:
   providing a light with periodically varying polarization to an optical measurement apparatus, which comprises, as optical elements:
   a beam splitter,
   a first photo sensor, exposed by a first partial beam from the beam splitter,
   an optical filter, and
   a second photo sensor, arranged downstream of the optical filter, exposed by a second partial beam from the beam splitter, wherein the angularity and relative position between multiple optical elements is arranged to be adjustable;
   irradiating the light into the beam splitter, so that both photo sensors are exposed by each respective partial beam;
   generating a difference signal between output signals of each of the photo sensors;
   varying the position and/or angularity of at least one optical element, and measuring the difference signal; and
   determining the combination of angularity/position of the elements which achieves a minimum difference signal.

9. The method according to claim 8, further comprising:
   measuring a mechanical quantity using the optical measurement apparatus.

10. The method according to claim 9, further comprising:
    applying the mechanical quantity to a fiber Bragg grating, so that the Bragg wavelength of the fiber Bragg grating is changed by the mechanical quantity;
    splitting a secondary light output from the fiber Bragg grating by use of the beam splitter into a first and second partial beam;
    filtering the secondary light modified by the fiber Bragg grating depending on the mechanical quantity, by use of the optical filter;
    determining the intensity of the filtered first and second partial beams of the secondary light;
    comparing the determined intensities of the filtered first and second partial beams of the secondary light; and
    determining the mechanical quantity from the intensity comparison.

* * * * *